I. JONES.
GATE CUTTER AND BEAD FORMER FOR PIPE MOLDS.
APPLICATION FILED JUNE 22, 1918.

1,304,060.

Patented May 20, 1919.
2 SHEETS—SHEET 1.

Inventor
Isaac Jones
By
Chambers & Hubbell
His Attorneys

I. JONES.
GATE CUTTER AND BEAD FORMER FOR PIPE MOLDS.
APPLICATION FILED JUNE 22, 1918.

1,304,060.

Patented May 20, 1919.
2 SHEETS—SHEET 2.

Inventor
Isaac Jones
By Chambers & Hubbell
his Attorneys

UNITED STATES PATENT OFFICE.

ISAAC JONES, OF BESSEMER, ALABAMA, ASSIGNOR TO UNITED STATES CAST IRON PIPE AND FOUNDRY COMPANY, OF BURLINGTON, NEW JERSEY, A CORPORATION OF NEW JERSEY.

GATE-CUTTER AND BEAD-FORMER FOR PIPE-MOLDS.

1,304,060.

Specification of Letters Patent.

Patented May 20, 1919.

Application filed June 22, 1918. Serial No. 241,339.

*To all whom it may concern:*

Be it known that I, ISAAC JONES, a citizen of the United States of America, and resident of Bessemer, in the county of Jefferson and State of Alabama, have invented certain new and useful Improvements in Gate-Cutters and Bead-Formers for Pipe-Molds, of which the following is a true and exact description, reference being had to the accompanying drawings, which form a part thereof.

My present invention relates to pipe molding apparatus, and has for its object to provide simple and effective means for forming the gates or channels for the flow of metal in the upper portion of a vertical pipe mold and for forming the circumferential channel in the outer wall of the pipe mold cavity provided to receive the metal forming the bead or external rib formed at the end of certain types of cast metal pipes.

The various features of novelty which characterize my invention are pointed out with particularity in the claims annexed hereto and forming a part of this specification. For a better understanding of the invention, however, and of the advantages possessed by it, reference should be had to the accompanying drawings and descriptive matter in which I have illustrated and described a preferred embodiment of my invention.

Of the drawings:

Fig. 4 is a sectional elevation of a portion of the completed mold with its core in place.

Figure 1:
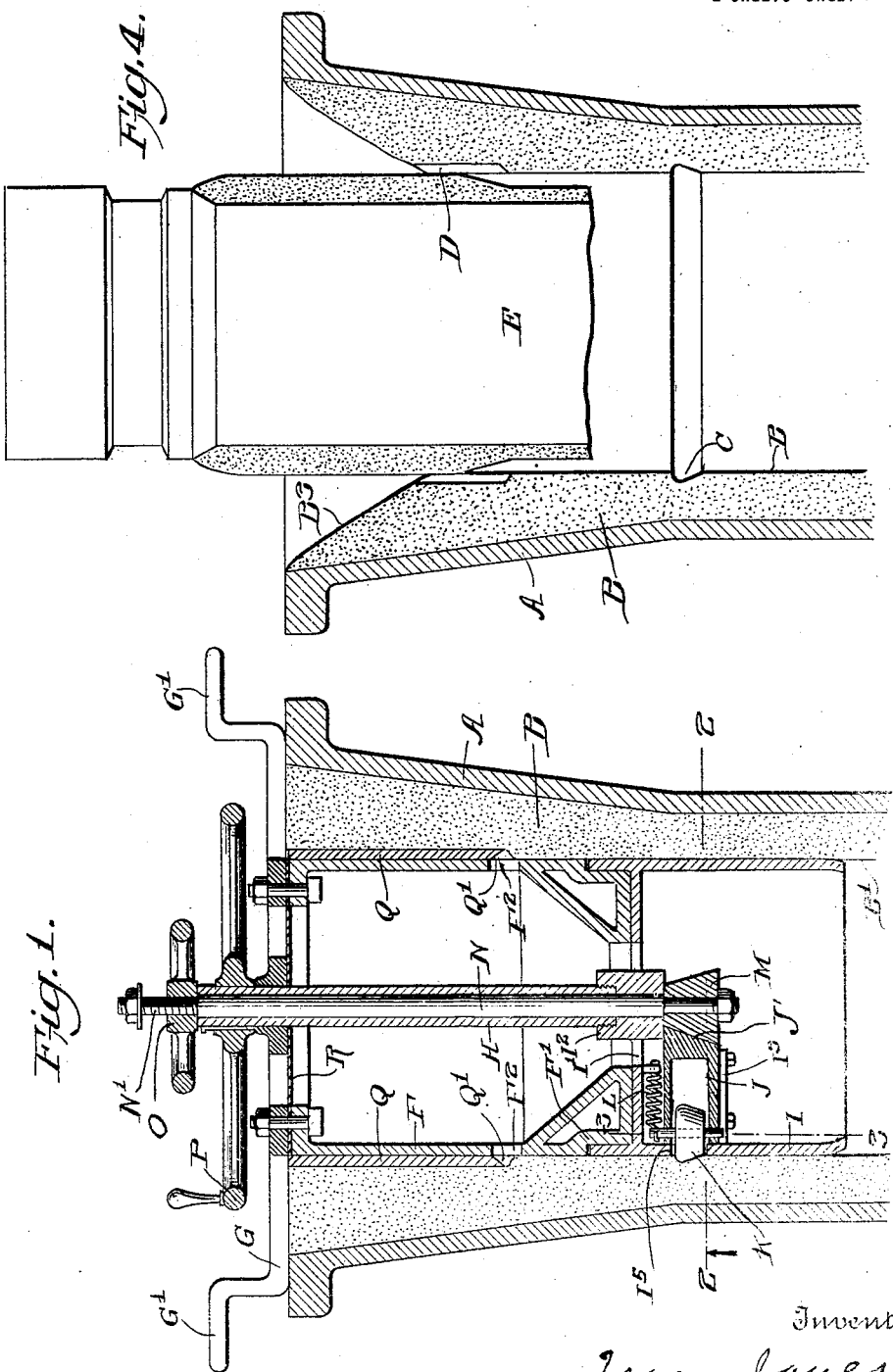
Figure 1 is a sectional elevation of the upper portion of a vertical pipe mold with my gate cutting and bead forming appliance in place.
Figure 2:
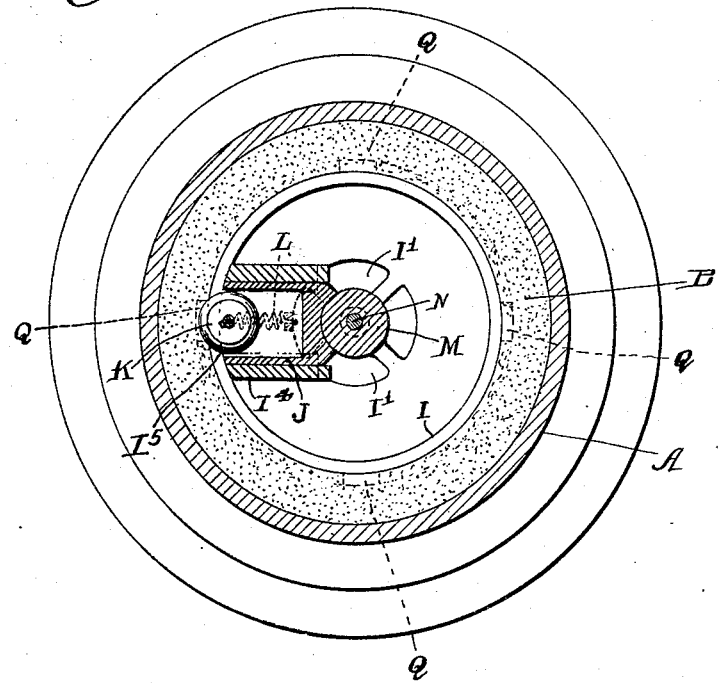
Fig. 2 is a sectional plan on the line 2—2 of Fig. 1.

In the drawings, A represents the pipe mold flask, and B the sand or other mold forming material. In forming a mold of this character the mold forming material is first compacted in place in an annular mass, the inner cylindrical wall B' of which forms the outer wall of the mold cavity. The finished mold is shown in Fig. 4 and my improved gate cutting and bead forming apparatus is intended to form the bead groove C and gate channels D through which pipe forming material is poured in a molten condition into the mold cavity between the inner wall of the compacted mold material B and the outer surface of the core E.

Figure 3:
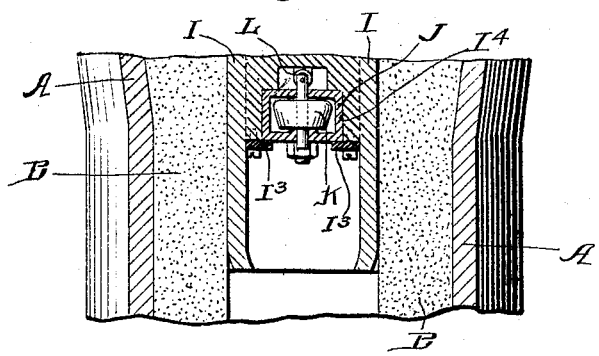
Fig. 3 is a partial section on the line 3—3 of Fig. 1.

The gate cutting and bead forming appliance proper comprises a tubular body F, which is adapted to be axially inserted in the upper end of the mold cavity, and is shown as having detachably secured to its upper end a spider G, which in the inserted condition of the appliance rests at its outer edge upon the upper end of the flask, and is provided with handle extensions G' by which the appliance may be manipulated and securely held in position. Axially mounted in the body F and journaled in the spider G is a tubular shaft H, which has secured to its lower end a tubular member I, which forms an extension of the member F. As shown, the extension I is provided with an internal flange or spider portion I' formed with a central hub socket $I^2$, into which the lower end of the shaft H is secured as by threading the parts together. The body F is provided at its lower end with an internally offset portion F' against the lower end of which the upper surface of the spider I' bears, and about which the upper end of the inner wall of the member I is journaled. The member I is formed with a guideway $I^4$, including removable guide blocks $I^3$ (see Fig. 3), for a radially movable block J. At the outer end of the latter is mounted a bead forming roll K, which may project beyond the outer surface of the member I through the opening $I^5$ in the latter. A spring L tends to hold the sliding block in a retracted position, in which the bead forming roll K lies wholly within the peripheral surface of the member I. At its inner end the sliding block J is formed with a beveled surface J'. A wedge block M is movable axially of the members F and I by means of a rod N axially disposed in the tubular shaft H, and provided at its upper end with a threaded portion N' surrounded by a nut forming the hub portion of a hand wheel O, which bears against the upper end of the tubular shaft H. By rotating the hand wheel O the bar N may be raised or lowered to force the block J radially outward or to permit the block to be retracted by the action of the spring L. The shaft H has secured to its upper end an operating device shown as consisting of a hand wheel P, and by rotating the hand wheel P the member I may be rotated relatively of the member F. This rotation of the member I, when the bead forming roll K is advanced radially outward to the position shown in Fig. 1, forms the circular groove or bead cavity C in the outer wall B' of the mold cavity.

The gate cutters are in the form of axially extending bars Q, with beveled undercut lower ends Q' which are secured to the outer wall of the member F. Openings F² are formed in the member F at the inner sides of the undercut lower ends Q' of the cutter bars Q. Advantageously, as shown, the annular space between the member F and tubular shaft H is entirely closed at its upper end by interposing a suitable diaphragm R between the upper end of the sleeve F and the spider G.

In operation the extension I is first inserted in the upper end of the mold cavity and then, with the bead forming roll K retracted, the appliance is pushed down into the mold until the spider G rests upon the upper end of the flask, as shown in Fig. 1. The sand cut away by the gate cutters Q passes to the inside of the member F through the opening F², and falls down through the mold cavity which is normally open at its lower end at this stage of operation. The gate channels D are thus cut during the insertion of the appliance. The hand wheel O is next manipulated to raise the wedge block M and thereby force the sliding block J outward until the bead forming roll K is carried into the position shown in Fig. 1. The hand wheel P then is rotated to thereby turn the hollow shaft H and rotate the member I and bead forming roll K about the axis of the mold cavity to thereby form the bead channel C. The cutter bars Q coöperate with the mold to hold the member F stationary while the member I is thus being rotated. The hand wheel O is next manipulated to lower the wedge M, thus permitting the bead forming roll K to be retracted by the spring L, after which the appliance may be removed from the mold. The gate cutting and bead forming operation will ordinarily be carried out while the mold is being dried, and the diaphragm R protects the hands of the operator from the hot air or vapor which would otherwise pass out through the upper end of the mold while the gates D are being cut and the bead channel C formed. After the gate cutting and bead forming appliance is removed from the mold a portion of the mold material is cut away as by means of a trowel to form the basin portion B³ of the mold. When thereafter the core E is put in place, as shown in Fig. 4, and molten metal is poured into the basin B³; this metal passes from the basin into the mold cavity proper through the gate channels D previously formed by the operation of the gate cutters Q.

While in accordance with the provisions of the statutes I have illustrated and described the best form of my invention now known to me, it will be apparent to those skilled in the art that changes may be made in the form of my invention without departing from the spirit, and that some features of my invention may sometimes be used to advantage without a corresponding use of other features of the invention.

Having now described my invention, what I claim as new and desire to secure by Letters Patent, is:

1. A pipe molding appliance comprising a body portion adapted to be axially inserted in a pipe mold and provided at its periphery with axially extending cutter bar portions and formed with openings for the escape through said body portion of the mold material gouged out of the mold by said cutter bar portions, and provided with a bead forming element and means mounted in said body portion for adjusting said element toward and away from the axis of the pipe mold and for rotating it about the axis of the mold.

2. A pipe molding appliance comprising a member adapted to be axially inserted in a pipe mold and provided at its periphery with axially extending cutter bar portions and formed with openings for the escape through said body of the mold material gouged out of the mold by said projections.

3. A pipe molding appliance comprising a member adapted to be axially inserted in a pipe mold and provided at its periphery with axially extending cutter bar portions and formed with openings for the escape through said body of the mold material gouged out of the mold by said cutter bar portions, and means secured to the outer end of said member for engaging the end of the mold.

4. A pipe molding appliance comprising a cylindrical body portion adapted to be axially inserted in a pipe mold and formed with an opening through its side intermediate its ends in combination with a bead forming element supported inside the cylindrical body portion and movable therein from a position in which it extends through the side opening to one in which it does not so project, means mounted in the body portion for moving the bead forming element and means for rotating the body portion and bead forming element together.

5. A pipe molding appliance comprising a tubular body adapted to be axially inserted in a pipe mold and provided at its periphery with axially extending cutter bar portions undercut at their ends, said body having openings in its wall adjacent the undercut ends of the said cutter bar portions.

6. A pipe molding appliance comprising a body portion adapted to be axially inserted in the end of the pipe mold, a member journaled in said body at the inner end of the latter and formed with a peripheral surface adapted to fit against the inner wall of the mold cavity, a bead forming element mounted in said member, means for rotating said member about the axis of the mold, and means for adjusting said element axially toward and away from said axis.

7. A pipe molding appliance comprising a body adapted to be axially inserted in the end of a pipe mold, a pair of shafts, one of which is tubular and surrounds the other, axially disposed, and journaled in said body, a tubular member having a peripheral surface adapted to fit against the inner wall of the mold cavity secured to one of said shafts and having an opening formed in its peripheral wall, a bead element mounted in said member and connected to the second of said shafts for adjustment thereby outward through said opening.

8. A pipe molding appliance comprising a body adapted to be axially inserted in the end of a pipe mold, a pair of shafts, one of which is tubular and surrounds the other, both axially disposed and journaled in said body, a tubular member having a peripheral surface adapted to fit against the inner wall of the mold cavity secured to one of said shafts and having an opening in its peripheral wall, a bead forming element mounted in said member, said element and the second of said shafts having coöperating wedge surfaces whereby an axial adjustment of said shaft effects a radial adjustment of said element.

ISAAC JONES.

Copies of this patent may be obtained for five cents each, by addressing the "Commissioner of Patents, Washington, D. C."